Dec. 9, 1930.  E. R. HUGHES  1,784,628
METHOD FOR REMOVING OIL FROM THE SHELL OF THE CASHEW NUT
Filed Nov. 29, 1926
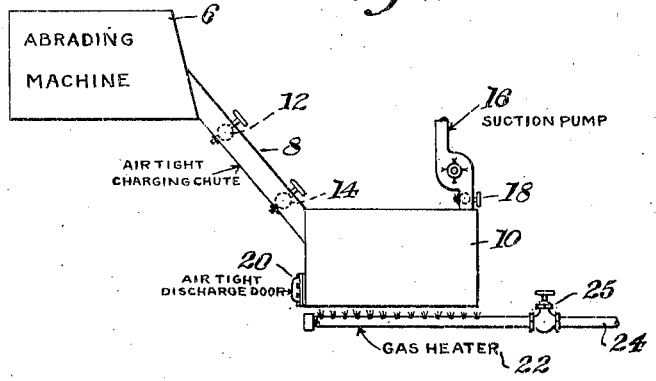
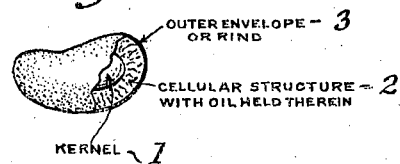
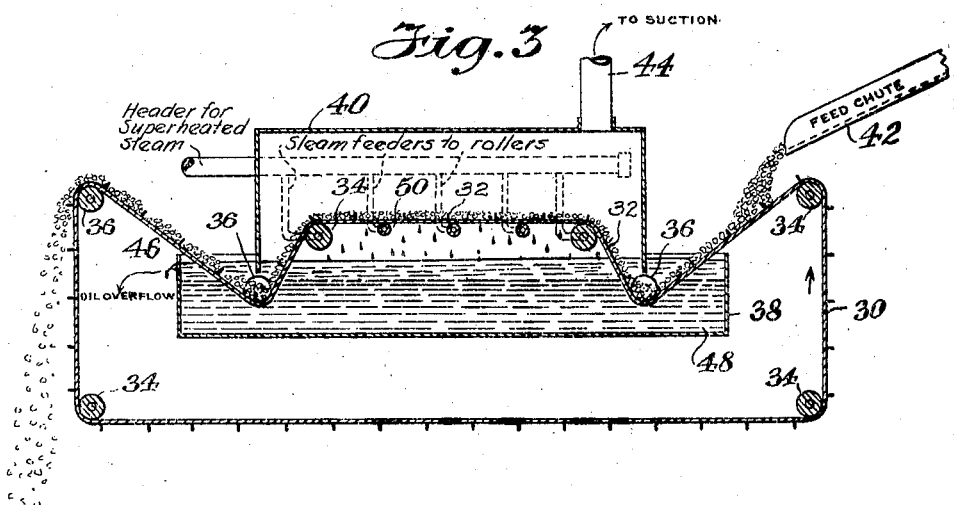
INVENTOR
Edward R. Hughes
BY
William A. Hughes
HIS ATTORNEY Patented Dec. 9, 1930

1,784,628

UNITED STATES PATENT OFFICE

EDWARD R. HUGHES, OF MORRISTOWN, NEW JERSEY, ASSIGNOR TO THE HARVEL CORPORATION, A CORPORATION OF NEW JERSEY

METHOD FOR REMOVING OIL FROM THE SHELL OF THE CASHEW NUT

Application filed November 29, 1926. Serial No. 151,510.

The present invention relates to method and apparatus for removing the oil from the cellular shell of the cashew nut.

Various objects and advantages of the invention will be obvious from the following particular description of forms of apparatus and of methods and steps embodying the invention or from an inspection of the accompanying drawing; and the invention also consists in certain new and useful features of construction and combinations of parts and in certain processes, methods and steps hereinafter set forth and claimed.

In the accompanying drawing there is shown for purposes of illustration forms of apparatus embodying the invention and also an illustration of the structure of the cashew nut, in which:

Fig. 1 is a longitudinal view in part section of a cashew nut.

Fig. 2 is a diagrammatic illustration in elevation of one form of apparatus, and Fig. 3 is a diagram in elevation and section of another form of apparatus embodying the invention.

In Fig. 1 of the drawing is illustrated a cashew nut having a kernel or meat portion 1 about which occurs a thin paper like casing similar to the inside skin next to the kernel of the peanut. About the kernel, over said inside skin, is an inner hard shell which is about $\frac{1}{32}$ of an inch in thickness. Spaced from the inner skin by a cellular structure 2 is a hard outer shell or rind 3. This cellular space extends in the neighborhood of three-sixteenths or a quarter of an inch from the inner hard shell to the outer shell, the cell walls run radially between the inner hard shell and the outer shell 3 and are more or less discontinuous, and the outer shell is about one-thirty-second of an inch in thickness. The space or cells between the inner hard shell and the outer shell is occupied by a liquid or oil which comprises cardol and anacardic acid and which is useful in the arts generally. The kernel is also useful, it being edible and valuable for the oil thereof which is different from the shell oil and has various uses. The kernel oil is a true oil somewhat similar to peanut oil or cottonseed oil, the shell oil is not of the same nature but for convenience is herein termed the shell oil.

In Fig. 2 of the drawing is diagrammatically shown an abrading machine 6 such as a tumbling mill with angular pebbles or metal lumps in it for abrading the outer shell of the cashew nut. A tube or chute 8 connects the mill 6 with an oven 10 and two valves or stops 12 and 14 serve to shut off either or both the mill 6 and oven 10 from a space in said tube 8. A suction pump 16 connects with the top of the oven 10 with a valve 18 between them, and an air tight door 20 covers a discharge opening at the bottom of the oven. A gas heater 22 with a supply pipe 24 and valve 25 therein serve for heating said oven 10.

In the use and operation of this embodiment of the invention cashew nuts in their shell are loaded into the mill 6 and are tumbled therein to abrade the outer shell thereof. After a charge has been tumbled and abraded they are discharged into tube 8 with the valve 14 closed. In the meantime oven 10 has been heated to about 400° to 750° F. by burner 22 and evacuated by pump 16. After a charge has been unloaded against said valve 14 said valve 12 is closed and valve 14 opened to discharge the nuts into the oven 10. The change in temperature of the nuts raises the pressure therein whereby is caused the discharge of the shell oil from the cells defined by the radial walls and outer shell 3 into the oven. The oil and the nuts are then discharged from the oven by door 20. The temperature of the oven when evacuated by pump 16 before putting a charge of nuts thereinto is preferably made below the carbonizing point of the shell oil 7 for example, at 600° F. but various temperatures can be used above or below this, depending on the rapidity of handling and the duration of time necessary to expel the oil from the shell. Also when working rapidly and at the higher temperatures the shells are not abraded because the pressure which will expel the oil will also break open the shell and break down the cell walls to permit the expulsion of the oil. Also either with or without the abrading the suction pump is not used in some cases because the pressure produced in the shell is sufficiently greater than atmospheric to break the shell and expel the oil.

When the nuts are abraded the shell 3 is preferably cut through to provide an opening outwardly from the cells defined by said shell 3 and the radial walls between it and the kernel 1. The degree of vacuum, when vacuum is used, can be made to depend on the temperature used because the higher the temperature the higher the pressure within the shells. When no vacuum at all is used the temperature can be about 600° to 650° F., and when a vacuum to about one-tenth of an atmosphere is used then the temperature can be about 400° to 500° F. These are merely as examples since other values of temperature and pressure can be used. The shells are abraded to cut through into the cells or to partly cut through and weaken the outer shell and when so partly or completely cut through a temperature of about 500° F. is used at about one-tenth of an atmosphere pressure. The internal pressure produced in the liquid in the shell will clear the liquid out of the shell in about five seconds or even less. After the larger portion of the liquid has been forced out the residue can be drained out by leaving the shells to stand either at normal temperatures and pressures or at raised temperature and/or at reduced pressure.

At the temperatures cited the pressure produced in the liquid in the cells within the shell is great enough to burst open the shell if unabraded or abraded to partly cut through the wall. In the preferred form, for rapid discharge of the shell oil from the shell, the shell is abraded at a number of points.

At higher temperatures say 500° to 900° F. the suction pump 16 is left off and said door 20 left open and the nuts and oil raked out therethrough as rapidly as they come into said oven 10 because at these temperatures and normal pressure the sudden entrance of the nuts into the high temperature zone will raise a sudden pressure in the nuts which will burst the shell 3 and force the liquid out. At the highest temperature carbonization of the shell liquid is kept nil or at a minimum by taking it out of the oven as quickly as it comes in because it will take an appreciable interval of time for the liquid to get up to the carbonizing temperature which is not below 750° to 800° F. By this arrangement the process can be made substantially continuous because the valves 12 and 14 can both be left open and a continuous stream of abraded or unabraded nuts passed through said slanting chute 8 where the temperature will be effective to force the liquid out of the shells 3 particularly at the lower end thereof from valve 14 down, and the liquid will be separated from the shells before or as they leave said chute 8 to enter the oven 10 proper and before they strike the floor of the oven.

Said door closure 20 has its chief use when vacuum is used to aid in producing a pressure differential between the outside and inside of the nut shells at the lower temperature, for example at about 400° F.

At the lower temperatures no appreciable quantity of the oil of the kernel is driven off and at the higher temperatures if any of the kernel oil is present it will be vaporized off.

In Fig. 3 of the drawing is diagrammatically shown an endless conveyor belt 30 having cleats 32 thereon which passes in the direction of the arrow around the spindles 34, 34 and under the spindles 36, 36 to go down into the vat or tank 38, up into the inverted box 40 and horizontally for a distance therein, then down under the edge of said box and thence up out of and down, under and back around said tank 38. A chute 42 serves to feed abraded or unabraded nuts to said conveyor 30 and a pipe 44 connects through a valve not shown to a suitable suction pump not shown. An overflow notch 46 is provided in the wall of said tank 38, and the bottom edge of said box 40 extends below the lower limit of said notch so that the oil 48 which is cashew shell oil forms a liquid seal for the interior of said inverted box 40. The supporting rollers 50 as well as the rollers 34, 34 within box 40 can be heated by gas or steam to supply heat to nuts in their passage through said box. The apparatus of this figure can be operated in manners similar to that described for Fig. 2, but this has the additional feature of being adapted for an automatically continuous process; the expelled oil flows from the nuts into tank 38 and out through said notch 46.

Although there is shown and described and is pointed out in the annexed claims certain novel features of the invention, it will be understood that various omissions, substitutions and changes in the several steps of the processes and in their operation and in the form and details of the apparatus illustrated may be made by those skilled in the art without departing from the spirit of the invention.

Having thus described my invention what I claim and desire to secure by Letters Patent is:

1. The method of removing the liquid from the cellular structure within the shell of the cashew nut which consists in subjecting the nuts to a sudden change from about normal temperature to about the charring temperature to produce an explosive pressure in said cellular structure whereby the liquid therein is forced out from the shell, and cooling the nut and liquid before charring can take place.

2. The method of removing the liquid from the cellular structure within the shell of the cashew nut which consists in subjecting the nuts to a sudden upward change in temperature to produce an explosive pressure within said cellular structure, and at the same time subjecting the nuts to a sudden downward change in pressure, whereby said liquid is forced out from the shell.

3. The method of removing the liquid from the cellular structure within the shell of the cashew nut which consists in weakening the shell and subjecting the nuts to a sudden upward change of temperature to produce an explosive pressure within said cellular structure whereby said liquid is forced out from the shell.

4. The method of removing the liquid from the cellular structure within the shell of the cashew nut which consists in weakening the shell and subjecting the nuts to a sudden upward change in temperature to produce an explosive pressure within said cellular structure, and at the same time subjecting the nuts to a sudden downward change in pressure, whereby said liquid is forced out from the shell.

5. The method of removing the liquid from the cellular structure of the shell of the cashew nut which comprises moving the nut through a heated zone to produce a pressure in said cellular structure of the nut whereby the liquid therein is forced out from the shell, the temperature of the high temperature zone and the rate of movement of the nut through the high temperature zone being relatively adjusted to avoid charring of the shell liquid.

6. The method of removing the liquid from the cellular structure of the shell of the cashew nut which comprises subjecting the nut to a comparatively sudden upward change in temperature to a point below the charring temperature of said liquid, to produce a pressure in said cellular structure whereby the liquid therein is forced out from the shell.

7. The method of removing the liquid from the cellular structure of the shell of the cashew nut which comprises weakening of the outer shell of the nut and subjecting the nut to increased temperature to produce a pressure in the cellular spaces of the shell sufficient to force the liquid from the shell.

Signed at Hoboken in the county of Hudson and State of New Jersey, this 24th day of June, A. D. 1926.

EDWARD R. HUGHES.